Patented July 2, 1946

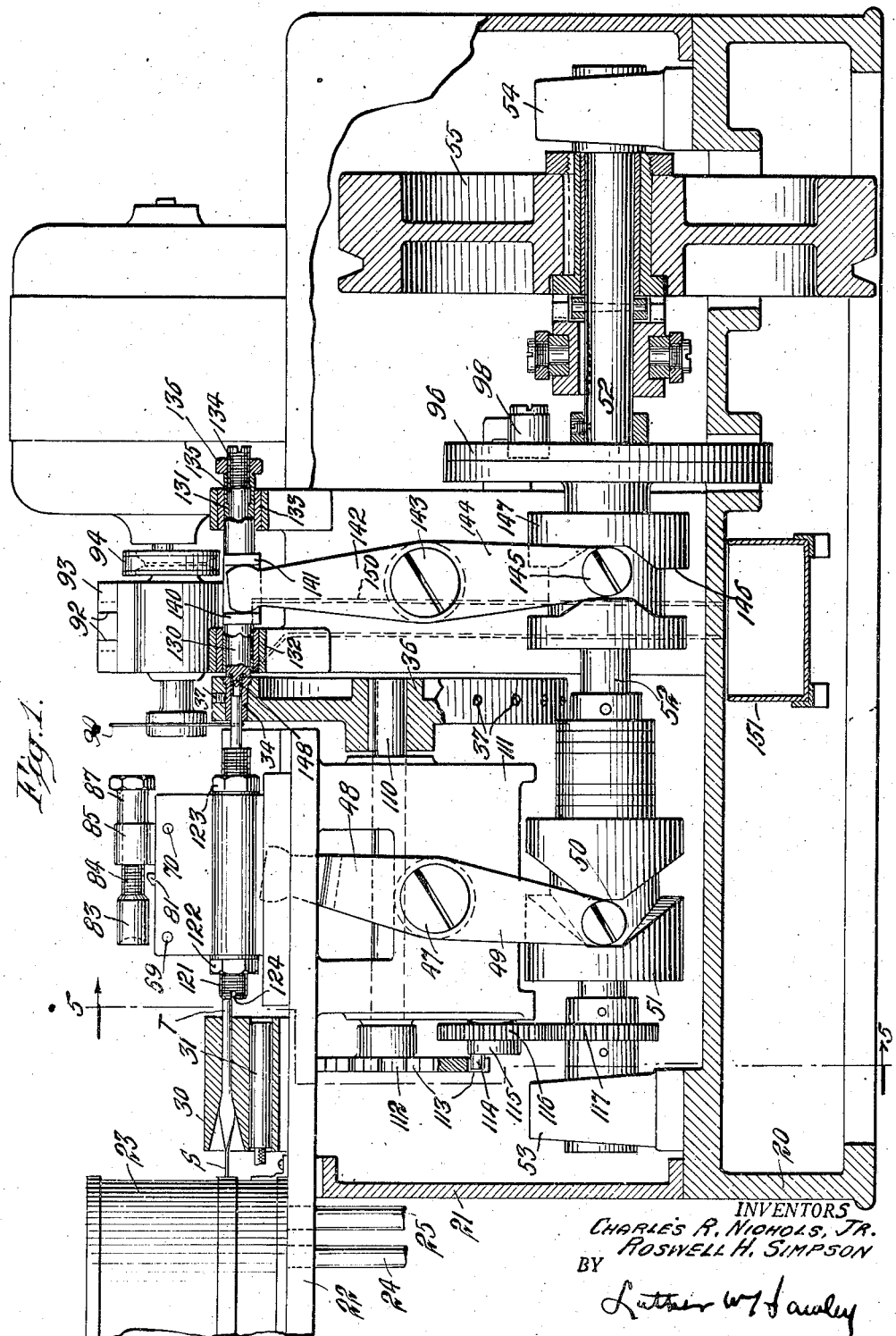

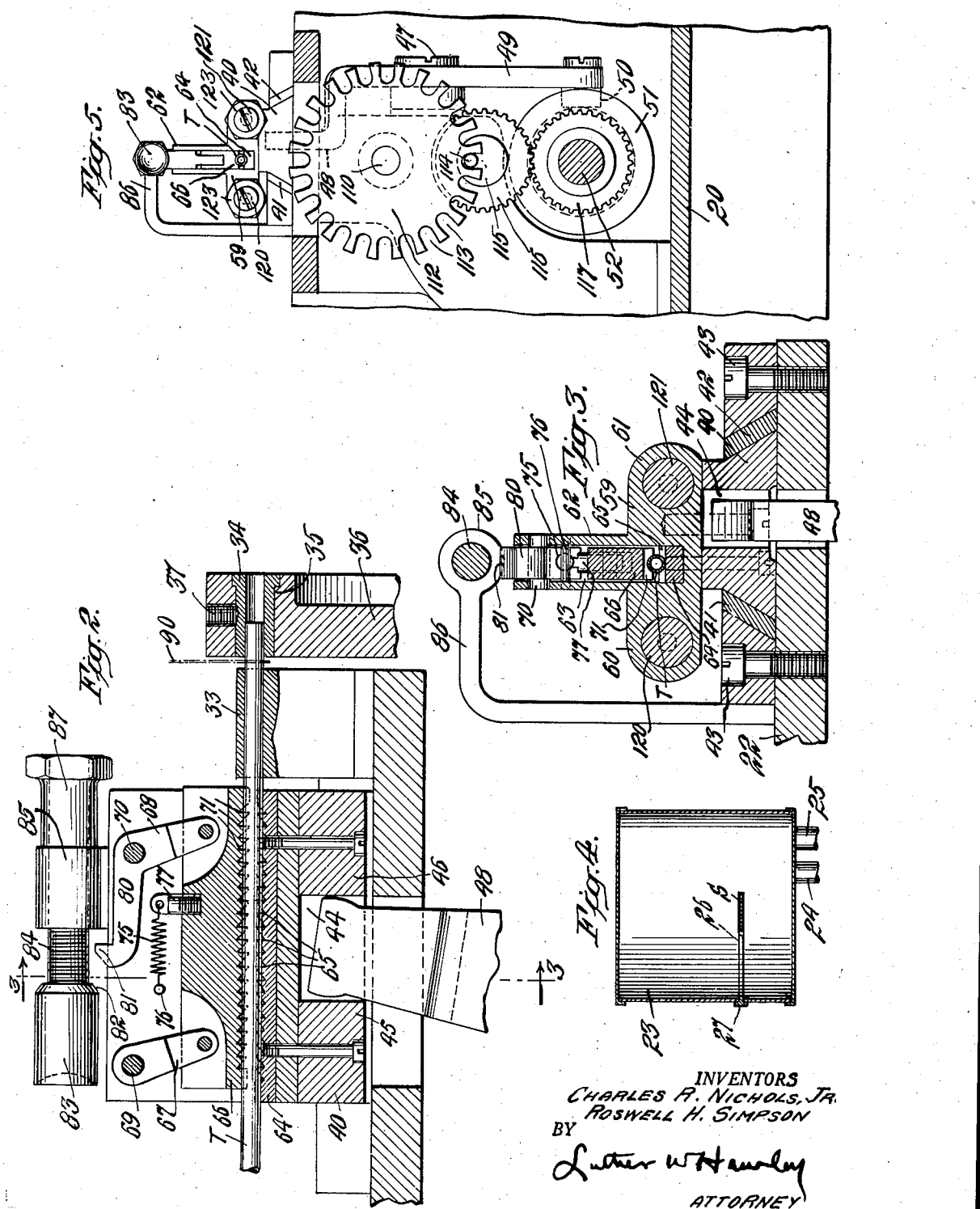

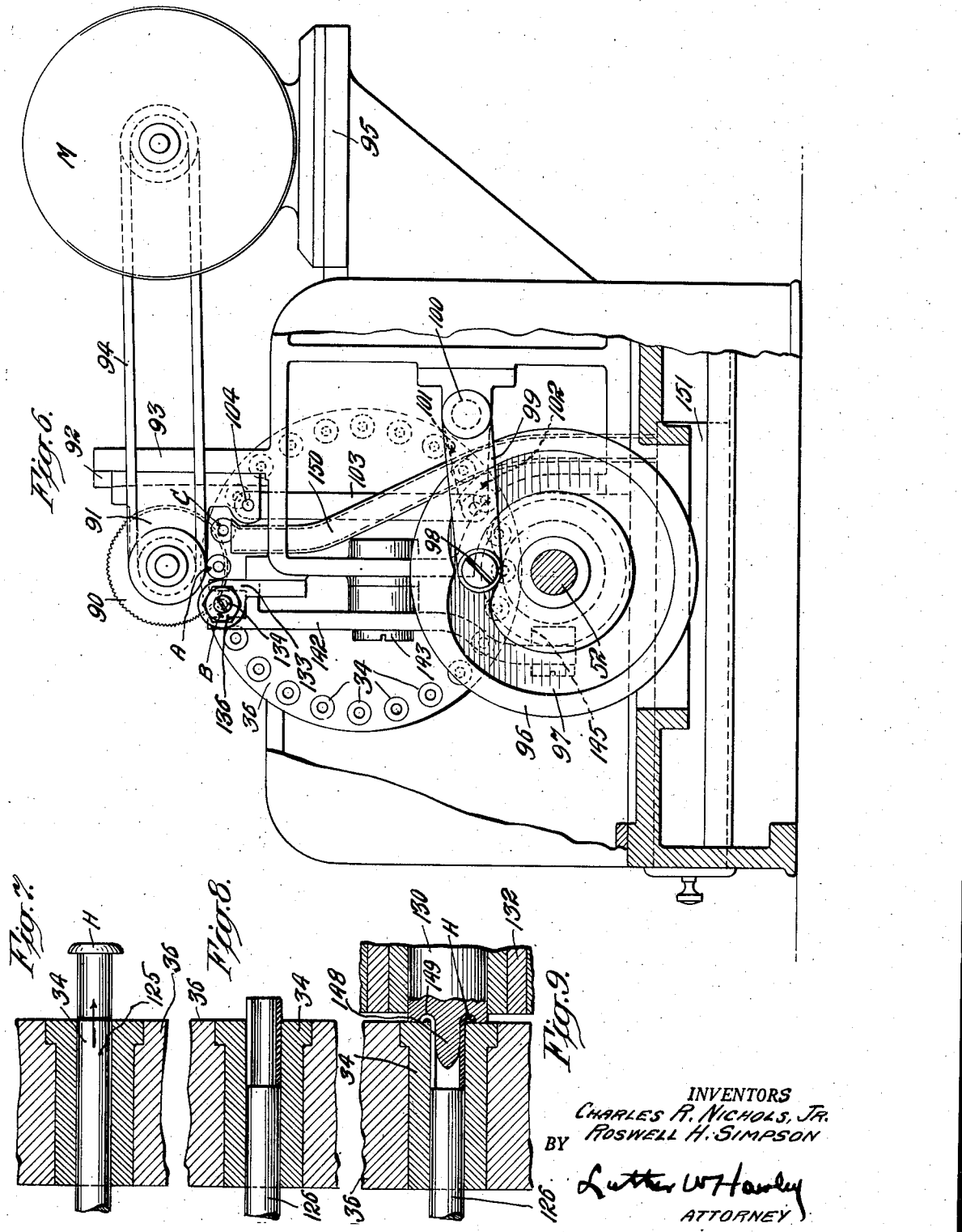

2,403,297

UNITED STATES PATENT OFFICE 2,403,297

MACHINE FOR MAKING HOLLOW RIVETS

Charles R. Nichols, Jr., Jersey City, N. J., and Roswell H. Simpson, Staten Island, N. Y., assignors to Joseph Dixon Crucible Company, Jersey City, N. J., a corporation of New Jersey Application January 4, 1945, Serial No. 571,336

12 Claims. (Cl. 10—11)

This invention relates to a machine for making hollow rivets.

More particularly stated, the invention relates to a machine for forming or making hollow rivets from a strip of fiber or plastic sheet material.

The invention has for its object to provide a simple, practical and efficient machine for forming a strip of fiber or plastic material into a hollow tube, cutting the tube to a predetermined length, and heading over one end of the tube to form a hollow rivet.

Further objects of the invention will appear from the following specification taken in connection with the drawings which form a part of this application, and in which Fig. 1 is an elevational view, partly in section, of a machine constructed in accordance with the invention;

Fig. 2 is a sectional detail elevation illustrating the tube feeding means;

Fig. 3 is a transverse sectional elevation taken substantially on line 3—3 of Fig. 2, looking in the direction of the arrows;

Fig. 4 is a sectional elevation of the heating tank in which the strip of material is heated prior to the formation of the strip and tube;

Fig. 5 is a detail sectional elevation taken substantially on line 5—5 of Fig. 1, looking in the direction of the arrows;

Fig. 6 is an elevational view, partly in section, taken at right angles to Fig. 1 and showing the operative connections for moving the tube cutting saw into and out of operative relation to the tube;

Fig. 7 is an enlarged sectional elevation of a portion of the carrier into which the tube is fed and in which the tube is formed into a rivet, this view illustrating the ejector plunger in its forward position in which the rivet has been ejected from the carrier;

Fig. 8 is a view similar to Fig. 7 but showing the tube feeding and positioning plunger in its forward position in which the tube has been properly positioned for the heading operation; and Fig. 9 is a view similar to Fig. 8 but showing the anvil or header in its operative position in which the head has been formed in the hollow tube, thus forming the rivet.

The invention briefly described consists of a machine having means for heating and softening a strip of fiber or plastic material, means for folding the strip into a tube, means for cutting the strip to a predetermined length, and means for intermittently feeding the tube to a carrier and for heading over the tube in the carrier. The reciprocating strip feeding means also has operable in conjunction therewith, means for positioning the severed tube in the carrier and for holding the tube in this position during the heading operation, and means for ejecting the finished hollow rivet after the tube has been headed over. For each reciprocation all three of these operations are performed, the carrier being provided with a plurality of peripherally spaced dies for receiving the tube and for holding the tube during successive operations. Further details of the invention will appear from the following description.

In the particular embodiment of the invention illustrated in the drawings, the machine comprises a base 20, a frame 21 extending upwardly therefrom, and a table or plate 22 supported on the frame 21.

The strip S of fiber or plastic material passes through a tank 23 supported on the table 22 and having inlet and outlet pipes 24 and 25 connected thereto for conducting steam or a suitable heating medium to and from the tank 23. A portion of the peripheral surface of the tank 23 is slit, as shown at 26, to permit the strip S to pass through the wall of the tank. This slit is closed by an arcuate closure member 27 after the strip has been moved into the slit.

During the passage of the strip through the tank 23, the strip is moistened and heated, thus rendering it flexible. From the tank the strip passes through a suitable folding die 30 which has heating means 31 to partially dry the strip during its passage through the die. The die 30 folds the strip into a tube T.

The tube T is fed intermittently by feeding means hereinafter described through a guide 33 into one of a plurality of dies or cylindrical supporting tubes 34 which are mounted in peripherally spaced, concentrically arranged openings 35 in a carrier wheel 36. The dies or cylindrical supports 34 are held in the carrier by set screws 37.

*Tube feeding, positioning and rivet ejecting means*

The reciprocatable mechanism for intermittently feeding the tube T comprises a block 40 which is slidably mounted in guideways 41 and 42 which are secured by screws 43 to the table or support 22. The block 40 has a recess 44 formed between portions 45 and 46, the recess 44 receiving the upper end of a lever which is pivotally mounted at 47 and has an upwardly extending arm 48 and a downwardly extending arm 49. The arm 49 carries a roller 50 which is disposed in the cam groove of a cam 51 mounted on a shaft 52 which is supported in suitable bearings 53 and 54. As the shaft 52 is rotated, the cam 51 will oscillate the lever and will cause the arm 48 thereof to reciprocate the block 40 and parts carried thereby.

The shaft 52 can be driven in any suitable manner and, as shown, is provided with a pulley 55 which is connected to any suitable source of power.

The block 40 has secured thereto and disposed thereabove, a T-shaped block 59 having laterally extending portions 60 and 61 and an upwardly extending portion 62. The portion 62 and the central portion of the block 59 have a vertically extending recess 63 therein. In the bottom of the recess 63 there is secured a bar 64 having upwardly extending teeth 65. Above the bar 64 there is mounted a bar 66 which is supported on links 67 and 68 mounted on pivots 69 and 70, which in turn are mounted in the portion 62. The lower end of the bar 66 is provided with teeth 71. The bar 66 is normally held in its lowermost position on the links 67 and 68 by a spring 75 which is secured to a fixed pin 76 carried by the portion 62 and to a stud 77 which is threaded into the upper portion of the bar 66.

The tube T passes between the bars 64 and 66 and during the movement of the block 40 and of the T-shaped block 59 carried thereby to the right, viewing Fig. 2, the tube T will be fed forwardly through the support 33 and into one of the dies or cylindrical supporting tubes 34 carried by the carrier wheel 36.

Means is provided for determining the extent of feed of the tube or, in other words, the length of the tube which is fed into the die 34. This means will now be described.

The link 68 has a rearwardly extending arm 80 having formed thereon on its rear end, viewing Fig. 2, a beveled upwardly extending tooth 81. The tooth 81 is adapted to engage a beveled end 82 of a cylindrical feed control member 83 which is carried by a threaded screw 84 adjustably mounted in a threaded sleeve 85 carried by a bracket 86 which is supported on the table 22. The screw 84 has a head 87 and by turning the head the screw can be adjusted in the sleeve 85, thus determining the position of the cylindrical control member 83.

During the retracting movement of the block 59 and block 40 the tooth 81 will engage the feed control member 83 and will be depressed, thus swinging the link 68 in an anti-clockwise direction and lifting the bar 66 out of engagement with the tube T. During the movement of the block in the opposite direction, or to the right, viewing Fig. 2, the feeding engagement between the bar 66 and the tube will take place when the tooth 81 is released from engagement with the surface of the control member 83. Thus the amount of feed of the tube T is determined by the adjustment of the screw 84 and of the cylindrical feed control member 83 carried thereby.

The tube T is fed in a manner above described into one of the supports or dies 34 carried by the wheel 36. Thereupon the forward end of the tube is severed by a rotary saw 90 which is mounted in suitable bearings carried by a bracket 91, which in turn is vertically slidable in suitable guideways 92 carried by a support 93. The saw 90 is driven by a belt 94, which in turn is driven by a motor M mounted on a bracket 95.

The bracket 91 is vertically reciprocated in timed relation to the reciprocating feeding mechanism above described and this is accomplished by means of a cam 96 carried by the shaft 52 and having a cam groove 97 in which is mounted a roller 98 carried by an arm 99. The arm 99 is secured to a stub shaft 100 which is mounted in suitable bearings and has also secured thereto an arm 101 which is pivoted at 102 to a link 103, the upper end of which is pivoted at 104 to the bracket 91.

In this manner, as soon as the tube has been fed into one of the dies 34, the saw 90 is pulled downwardly to the position shown in Figs. 1 and 6 and severs the tube. The length of the tube severed is determined by the adjustment of the feeding mechanism above described.

The carrier wheel 36 is mounted on a spindle 110 which is supported on a bracket 111 and has mounted on the other end thereof a turret or Geneva wheel 112 having inwardly extending notches 113. The wheel 112 is driven by a pin 114 which is carried by a disk 115 secured to a gear 116. The gear 116 meshes with a gear 117 which is mounted on the shaft 52. The gearing is so proportioned that the carrier wheel 36 will be intermittently rotated in timed relation to the operation of the reciprocating feeding mechanism above described, so that the dies 34 will be properly positioned to receive the advance end of the tube T and that the wheel will be in a position of rest as the tube is fed forwardly into the die. Moreover, the feeding movement of the wheel is so determined that each movement will move one die 34 into receiving position or, in other words, for each increment of movement of the wheel 36 the wheel will be rotated through an arc coextensive with the distance between successive dies.

The reciprocating movement of the blocks 40 and 59 not only feeds the tube T into one of the dies but also simultaneously positions the tube last fed into the die and ejects a finished rivet from another die.

The laterally extending portions 60 and 61 have adjustably mounted therein, threaded studs 120 and 121. Each of these studs has threaded thereon, at the ends thereof, lock nuts 122 and 123 which are adapted to lock the studs in the desired adjusted position in the opening through the extension 60 or 61. Each stud has a notch 124 at the rear end thereof to facilitate the adjustment of the stud.

The studs 120 and 121 have projecting outwardly therefrom and carried thereby, plungers 125 and 126. The plunger 125, as shown in Fig. 7, acts as an ejector to eject the finished rivet from the die 34 by which it is carried. The plunger 126, as shown in Figs. 8 and 9, serves to position the severed tube in the die 34 and by adjusting the stud 121 which carries this plunger the position of adjustment of the severed tube can be accurately determined. Obviously, this adjustment must be changed for different lengths of tube. In addition to positioning the tube in the proper position for the heading operation, the plunger 126, as shown in Fig. 9, acts as a back support for the tube and holds the tube in position during the formation of the head H thereon.

Heading mechanism

The head is formed on the tube in the following manner. The heading mechanism comprises a reciprocable heading plunger 130 which is adjustably mounted in a sleeve 131 slidable in bearings 132 and 133. The plunger 130 has a threaded end 134 which is threaded into a threaded opening 135 in the sleeve 131 and a lock nut 136 is provided to lock the plunger in adjusted position in the sleeve. The sleeve 131 has laterally projecting therefrom, lugs 140 and 141 between which are positioned the bifurcated upper ends of an arm 142 of a lever mounted on a pivot 143 and having a downwardly extending arm 144 provided with a roller 145 disposed in a groove 146 of a cam 147 mounted on the shaft 52. As the lever is oscillated the plunger 130 will be reciprocated and alternately moved to operative and inoperative position.

From the showing in Figs. 1 and 9 it will be noted that the operative end of the plunger 130 has a centrally disposed, longitudinally projecting extension 148 dimensioned to enter the end of the tube positioned and held in the die 34. Surrounding the base of the extension 148 is an annular groove 149 suitably formed to form a rounded head on the hollow rivet H, in the manner shown in Fig. 9.

At the same time that the tube is headed over to form a hollow rivet in one of the dies 34 of the carrier wheel 36, a finished rivet is ejected by the plunger 125 from another of the dies 34. This finished rivet has travelled substantially 360° from the position in which the head was formed thereon. In order to make this clear, the position in which the hollow tube is cut off is shown in Fig. 6 at A, the position in which the tube is headed over is shown at B, and the position in which the finished rivet is ejected is shown at C. It is important that a considerable period of time elapse from the formation of the rivet to the ejection thereof from the die since the rivet should be permitted to cool and set so that the split tube which forms the rivet will not open up.

If desired, the slit in the tube and in the rivet can be sealed by suitable adhesive mechanism and also, in order to facilitate the drying and setting operation, the wheel 36 can be heated in any suitable manner.

Summary of operation

From the foregoing description it will be clear that the machine described operates in the following manner. The strip S is softened and rendered flexible during its passage through the tank 23 and is then folded into a tube T and is fed intermittently by the reciprocating feeding mechanism into the dies 34 carried by the carrier wheel 36. The length of tube fed can be accurately determined by adjusting the screw 84. After the tube has been cut it is accurately positioned and held in the die for the heading operation by the plunger 126 and after the hollow rivet has been formed and has dried and set it is ejected by the plunger 125. Attention is called to the fact that the diameter and length of the rivets may be changed by changing the size of the dies 34 and plungers and the feed of the tube and plungers.

The ejected rivets drop into a chute 150 by means of which they are conducted downwardly to a receptacle or drawer 151.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What we claim is:

1. In a machine for making hollow rivets comprising means for forming a tube of fiber or plastic material, means for intermittently feeding said tube, a carrier, a plurality of cylindrical tube supports on said carrier disposed in a position to receive the fed tube, means for severing a predetermined length from the advance end of the tube after it has been fed into one of the tube supports on the carrier, means engageable with the severed tube for positioning and holding the tube for the heading operation, means for forming a head on the advance end of the tube so held, a source of power, and operative driving connections from said source of power to said carrier, said tube feeding means, said tube severing means, said tube positioning and holding means and said head forming means, said connections being synchronized to operate said several means in proper timed relation.

2. In a machine for making hollow rivets comprising means for forming a tube of fiber or plastic material, means for intermittently feeding said tube, a carrier, a plurality of cylindrical tube supports on said carrier disposed in a position to receive the fed tube, means for severing a predetermined length from the advance end of the tube after it has been fed into one of the tube supports on the carrier, means engageable with the severed tube for positioning and holding the tube for the heading operation, means for forming a head on the advance end of the tube so held, means for ejecting the headed tube from the carrier tube support, a source of power, and operative driving connections from said power source to said carrier, said tube feeding means, said tube severing means, said tube positioning and holding means, said head forming means and said ejecting means, said connections being synchronized to operate said several means in proper timed relation.

3. In a machine for making hollow rivets comprising means for forming a tube of fiber or plastic material, adjustable means for intermittently feeding said tube, a carrier, a plurality of cylindrical tube supports on said carrier disposed in a position to receive the fed tube, means for severing a predetermined length from the advance end of the tube after it has been fed into one of the tube supports on the carrier, adjustable means engageable with the severed tube for positioning and holding the tube for the heading operation, means for forming a head on the advance end of the tube so held, a source of power, and operative driving connections from said source of power to said carrier, said tube feeding means, said tube severing means, said tube positioning and holding means and said head forming means, said connections being synchronized to operate said several means in proper timed relation.

4. In a machine for making hollow rivets comprising means for forming a tube of fiber or plastic material, means for intermittently feeding said tube, a rotatable carrier, a plurality of concentrically arranged, peripherally spaced cylindrical tube supports on said carrier disposed in a position to receive the fed tube, means for severing a predetermined length from the advance end of the tube after it has been fed into one of the tube supports on the carrier, means engageable with the severed tube for positioning and holding the tube for the heading operation, means for forming a head on the advance end of the tube so held, a source of power, and operative driving connections from said source of power to said carrier, said tube feeding means, said tube severing means, said tube positioning and holding means and said head forming means, said connections being synchronized to operate said several means in proper timed relation.

5. In a machine for making hollow rivets, a movable carrier, a plurality of equally spaced tube supports on said carrier, means for feeding a tube to one of the tube supports, means for severing the advance end of said tube, means for positioning the previously severed length of tube in another of the tube supports and holding said length of tube for the heading operation, means for forming a head on the tube length so held, means for ejecting from another tube support on the carrier a headed tube previously formed, a source of power, and operative driving connections from said power source to said carrier, said tube feeding means, said tube severing means, said tube positioning and holding means, said head forming means and said ejecting means, said connections being synchronized to operate said several means in proper timed relation.

6. In a machine for making hollow rivets, a movable carrier, a plurality of equally spaced tube supports on said carrier, a reciprocatable member, means carried by said member for feeding a tube to one of the tube supports, means for severing the advance end of said tube, means carried by the reciprocatable member for positioning the previously severed length of tube in another of the tube supports and holding said length of tube for the heading operation, means for forming a head on the tube length so held, means carried by said reciprocatable member for ejecting from another tube support on the carrier a headed tube previously formed, a source of power, and operative driving connections from said power source to said carrier, said tube feeding means, said tube severing means, said tube positioning and holding means, said head forming means and said ejecting means, said connections being synchronized to operate said several means in proper timed relation.

7. In a machine for making hollow rivets, a movable carrier, a plurality of equally spaced tube supports on said carrier, adjustable means for feeding a tube to one of the tube supports, means for severing the advance end of said tube, adjustable means for positioning the previously severed length of tube in another of the tube supports and holding said length of tube for the heading operation, means for forming a head on the tube length so held, means for ejecting from another tube support on the carrier a headed tube previously formed, a source of power, and operative driving connections from said power source to said carrier, said tube feeding means, said tube severing means, said tube positioning and holding means, said head forming means and said ejecting means, said connections being synchronized to operate said several means in proper timed relation.

8. In a machine for making hollow rivets, a movable carrier, a plurality of equally spaced tube supports on said carrier, a reciprocatable member, adjustable means carried by said member for feeding a tube to one of the tube supports, means for severing the advance end of said tube, adjustable means carried by the reciprocatable member for positioning the previously severed length of tube in another of the tube supports and holding said length of tube for the heading operation, means for forming a head on the tube length so held, and means carried by said reciprocatable member for ejecting from another tube support on the carrier a headed tube previously formed, a source of power, and operative driving connections from said power source to said carrier, said tube feeding means, said tube severing means, said tube positioning and holding means, said head forming means and said ejecting means, said connections being synchronized to operate said several means in proper timed relation.

9. In a machine for forming hollow rivets, tube feeding means comprising a reciprocatable block, a gripping bar engageable with the tube, means for moving the bar downwardly into feeding engagement with the tube, and adjustable means for holding said gripping bar out of operative position, thereby determining the length of tube fed.

10. In a machine for making hollow rivets, a movable carrier, a plurality of equally spaced tube supports on said carrier, means for feeding a tube to one of the tube supports, means for severing the advance end of said tube, means for positioning the previously severed length of tube in another of the tube supports and holding said length of tube for the heading operation, means for forming a head on the tube length so held, means for ejecting from another tube support on the carrier a headed tube previously formed, said tube feeding means, tube positioning means and tube ejecting means being operable simultaneously, a source of power, and operative driving connections from said power source to said carrier, said tube feeding means, said tube severing means, said tube positioning and holding means, said head forming means and said ejecting means, said connections being synchronized to operate said several means in proper timed relation.

11. In a machine for making hollow rivets, a movable carrier, a plurality of removable, equally spaced tube supports on said carrier, means for feeding a tube to one of the tube supports, means for severing the advance end of said tube, means for positioning the previously severed length of tube in another of the tube supports and holding said length of tube for the heading operation, means for forming a head on the tube length so held, means for ejecting from another tube support on the carrier a headed tube previously formed, a source of power, and operative driving connections from said power source to said carrier, said tube feeding means, said tube severing means, said tube positioning and holding means, said head forming means and said ejecting means, said connections being synchronized to operate said several means in proper timed relation.

12. In a machine for making hollow rivets, a movable carrier, a plurality of removable, equally spaced tube supports on said carrier, adjustable and removable means for feeding a tube to one of the tube supports, means for severing the advance end of said tube, adjustable and removable means for positioning the previously severed length of tube in another of the tube supports and holding said length of tube for the heading operation, means for forming a head on the tube length so held, means for ejecting from another tube support on the carrier a headed tube previously formed, a source of power, and operative driving connections from said power source to said carrier, said tube feeding means, said tube severing means, said tube positioning and holding means, said head forming means and said ejecting means, said connections being synchronized to operate said several means in proper timed relation.

CHARLES R. NICHOLS, JR.
ROSWELL H. SIMPSON.